United States Patent [19]
Edwards et al.

[11] Patent Number: 5,622,642
[45] Date of Patent: Apr. 22, 1997

[54] SEALING APPARATUS FOR ELONGATE CABLES HAVING MOVABLE INSERT WITH GRIPPING MEMBERS

[75] Inventors: Larry M. Edwards, Fremont; Lawrence J. White, Newark; Timothy O. Stixrud, deceased, late of Redwood City, all of Calif., by Virginia M. Stixrud, heir

[73] Assignee: Raychem Corporation, Menlo Park, Calif.

[21] Appl. No.: 384,164

[22] Filed: Feb. 6, 1995

[51] Int. Cl.$^6$ ............. H05B 3/06; A44B 21/00; H02G 15/02

[52] U.S. Cl. ............. 219/542; 219/544; 219/546; 24/114.5; 338/214; 174/135; 174/74 A; 439/936

[58] Field of Search ............. 219/544, 546; 338/214; 174/74 A, 74 R, 84 C, 135; 24/114.5, 115 M, 136 R; 439/521–522, 201, 936, 877–878

[56] References Cited

U.S. PATENT DOCUMENTS

| | | | |
|---|---|---|---|
| 3,814,836 | 6/1974 | Neale, Sr. | 174/84 C |
| 3,821,464 | 6/1974 | Connon | 174/87 |
| 3,852,850 | 12/1974 | Filhaber | 24/136 R |
| 3,858,144 | 12/1974 | Bedard et al. | 338/22 R |
| 3,861,029 | 1/1975 | Smith-Johannsen et al. | 29/611 |
| 4,017,715 | 4/1977 | Whitney et al. | 219/553 |
| 4,242,573 | 12/1980 | Batliwalla | 219/528 |
| 4,334,148 | 6/1982 | Kampe | 219/553 |
| 4,334,351 | 6/1982 | Sopory | 29/611 |
| 4,426,339 | 1/1984 | Kamath et al. | 264/22 |
| 4,459,473 | 7/1984 | Kamath | 219/553 |
| 4,574,188 | 3/1986 | Midgley et al. | 219/549 |
| 4,595,724 | 6/1986 | Koblitz | 174/74 A |
| 4,600,261 | 7/1986 | Debbaut | 339/116 C |
| 4,667,772 | 5/1987 | Kammerer | 24/115 M |
| 4,690,831 | 9/1987 | Uken et al. | 427/44 |
| 4,716,183 | 12/1987 | Gamarra et al. | 522/80 |
| 4,726,785 | 2/1988 | Kerboul et al. | 439/417 |
| 4,751,350 | 6/1988 | Eaton | 174/87 |
| 4,777,063 | 10/1988 | Dubrow et al. | 427/44 |
| 4,864,725 | 9/1989 | Debbaut | 29/871 |
| 4,865,905 | 9/1989 | Uken | 428/220 |
| 4,877,943 | 10/1989 | Oiwa | 219/538 |
| 5,079,300 | 1/1992 | Dubrow et al. | 525/106 |
| 5,104,930 | 4/1992 | Rinde et al. | 524/871 |
| 5,111,032 | 5/1992 | Batliwalla et al. | 219/549 |
| 5,149,736 | 9/1992 | Gamarra | 524/490 |
| 5,289,613 | 3/1994 | Kohl | 24/136 R |
| 5,451,717 | 9/1995 | Itou | 174/74 R |

FOREIGN PATENT DOCUMENTS

| | | |
|---|---|---|
| WO86/01634 | 3/1986 | WIPO. |
| WO88/00603 | 1/1988 | WIPO. |
| WO90/05166 | 5/1990 | WIPO. |
| WO91/05014 | 4/1991 | WIPO. |
| WO93/23472 | 11/1993 | WIPO. |

OTHER PUBLICATIONS

International Search Report for Application No. PCT/US96/01511, mailed May 31, 1996.

*Primary Examiner*—Geoffrey S. Evans
*Assistant Examiner*—Raphael Valencia
*Attorney, Agent, or Firm*—Marguerite E. Gerstner; Herbert G. Burkard; Timothy H. P. Richardson

[57] ABSTRACT

An apparatus for sealing the end of an elongate cable such as an electrical heating cable which comprises a clip-shaped insert positioned within a tubular-shaped housing. Gripping members and pre-gripping members project from the interior surfaces of the arms of the insert and act to grip a cable when it is inserted into the device. A locking mechanism on the insert engages locking teeth on the housing and serves to hold the insert in position. A conformable gel component may be present. The apparatus provides high pullout force, as well as environmental sealing, for cables such as electrical heating cables or power cables.

20 Claims, 2 Drawing Sheets

5,622,642

SEALING APPARATUS FOR ELONGATE CABLES HAVING MOVABLE INSERT WITH GRIPPING MEMBERS

BACKGROUND OF THE INVENTION

1. Field of the Invention

This invention relates to sealing devices, particularly sealing devices for elongate heating cables.

2. Introduction to the Invention

It is often necessary to seal the end of an elongate cable such as a power cord or heating cable in order to provide electrical insulation, environmental protection, and/or mechanical shielding. A number of methods have been used to provide such a seal, including heat-recoverable tubing, end-caps, or boots; molded adhesive-filled boots; enclosures with gaskets or grommet seals; and wrapped tape. Many of these methods are craft-sensitive, difficult to install, require special tools, or are limited to a particular size or shape cable. In addition, some of the techniques require multiple parts which are difficult to manufacture and assemble.

Elongate heating cables are one type of cable which often requires an end seal. Such heating cables are known for use in the freeze protection and temperature maintenance of pipes. Particularly useful elongate heating cables comprise (a) first and second elongate electrodes, (b) a plurality of resistive heating elements connected in parallel between said electrodes, e.g. a continuous strip of a conductive polymer in which the electrodes are embedded or which is wrapped around the electrodes, and (c) an insulating jacket which surrounds the electrodes and heating elements. In addition, the heating cable often also comprises a metallic grounding layer, in the form of a braid or a tape, surrounding the insulating jacket, which serves to electrically ground the heating cable and provides abrasion resistance. The heating cable may be cut to the appropriate length for use in each application, and the ends must then be protected.

End caps and sealing devices for protecting the cut ends are known. These sealing devices not only seal the ends, but also prevent exposure to moisture and grip the heater in order to prevent pullout of the heater from the sealing device during use. The device disclosed in U.S. Pat. No. 4,751,350 (Eaton) comprises a cap in which a plurality of resilient projections positioned at specific angles with the cap are used to grip an electrical cable. The cap provides a particularly effective seal when it is filled with a gel or other conformable material which effectively contacts the inserted cable. The device disclosed in U.S. Pat. No. 4,877,943 (Oiwa) comprises a cap in which projections of graduated length positioned at specific angles are used to grip both the insulating jacket and the metallic braid of a heating cable in order to prevent the braid from slipping with respect to the insulating jacket which would decrease the pullout force, i.e. the amount of force required to remove the heating cable from the sealing device. The disclosures of both of these documents are incorporated herein by reference.

One problem with the conventional sealing devices disclosed by U.S. Pat. Nos. 4,751,350 and 4,877,943 is that relatively high insertion force, e.g. 3.6 to 4.5 kg (8 to 10 pounds), is required to insert the cable into the device. This is because it is necessary to deflect the projections inside the device sufficiently to engage the cable. In addition, a material, usually a plastic, that will allow such deflection often will not be sufficiently tough to provide requisite impact resistance. Thus, if the device is to be economically manufactured, for example, by molding, a compromise on the material used for the housing and the projections must be made. During impact testing, the resulting sealing device may experience flexing and deformation of the projections, decreasing the pullout force. Furthermore, despite the fact that sealing devices with projections of graduated length are known, it is often necessary to have devices of different sizes in order to accommodate and maintain adequate pullout force for cables of different thicknesses and/or widths.

SUMMARY OF THE INVENTION

We have now found that it is possible to make a sealing device that requires relatively low insertion force, is suitable for a wide variety of cable sizes and shapes, has adequate pullout force and impact resistance, and is easily manufactured and assembled. This is achieved by using a separate insert which is designed to be flexible inside the housing. The insert can be made in different sizes depending on cable requirements, but due to the flexibility and shape of the insert, a single insert is suitable for use for a variety of cables. As a result of this design, the distinct functions of the sealing device, i.e. to insulate and provide mechanical protection, to provide strain relief, and to seal, are separated and optimized. Thus, in a first aspect, this invention provides an apparatus for sealing the end of an elongate cable, said apparatus comprising (1) a housing of generally tubular shape, the housing comprising
 (a) a first open end and a second closed end,
 (b) a longitudinal top portion with an interior surface and an exterior surface, and
 (c) a longitudinal bottom portion with an interior surface and an exterior surface; and (2) an insert which is positioned within the housing and is free to move in an axial direction within the housing and in a vertical direction within the housing, which insert
 (a) is in the shape of a clip having a first open end and a second closed end,
 (b) comprises a first top arm with an interior surface and an exterior surface, and a second bottom arm with an interior surface and an exterior surface, said first and second arms extending from the closed end of the insert,
 (c) a plurality of first gripping members which are associated with the interior surface of the first arm, and
 (d) a plurality of second gripping members which are associated with the interior surface of the second arm.

In a second aspect, this invention provides an assembly comprising (A) an apparatus of the first aspect of the invention wherein the insert further comprises
 (e) at least one first pre-gripping member which is associated with the interior surface of the first arm, and
 (f) at least one second pre-gripping member which is associated with the interior surface of the second arm; and which apparatus further comprises
 (3) a gel component; and (B) an end of an elongate cable which is inserted through the open end of the insert and which directly contacts the gripping end of at least one first gripping member, one second gripping member, one first pre-gripping member, and one second pre-gripping member.

DETAILED DESCRIPTION OF THE INVENTION

Figure 1:
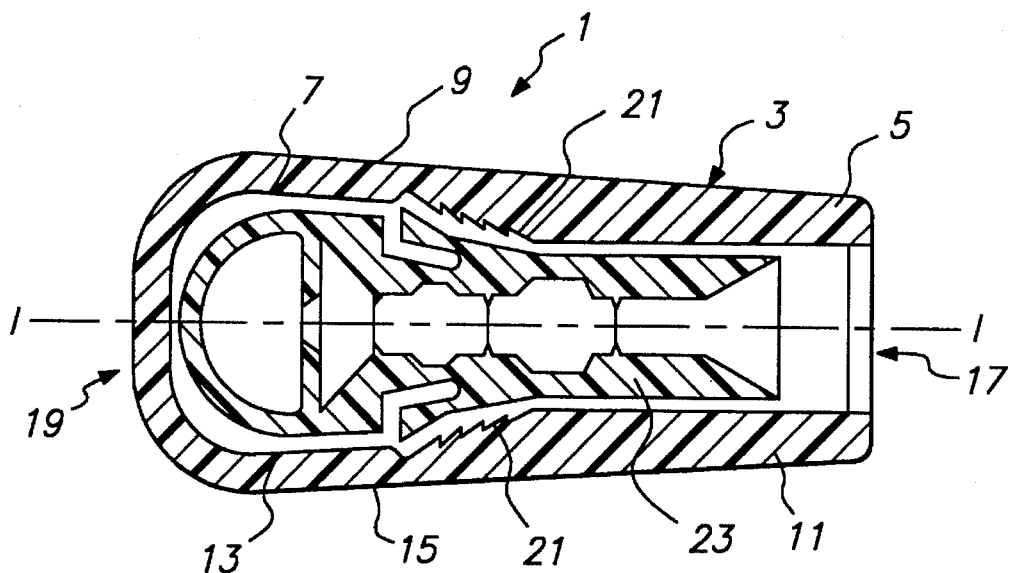
FIG. 1 is a cross-sectional view of an apparatus of the invention.

The sealing apparatus of the invention can be used to seal the end of any elongate cable, including electrical heating cables such as self-limiting strip heaters or mineral insulated heating cables, power cables or cords, or grounded power leads. Elongate electrical heating cables particularly appropriate for use with this sealing device are those which comprise first and second elongate electrodes, a plurality of resistive heating elements connected in parallel between the electrodes, and at least one insulating jacket surrounding the electrodes and heating elements. The insulating jacket is generally polymeric, in the form of a continuous polymer layer, although a polymeric braid or a polymer tape may be used. For some applications a polymeric insulating jacket is surrounded by a second layer, e.g. a second polymeric insulating layer such as a polyester tape, or a metallized tape such as aluminized polyester. The heating cable often comprises an optional metallic grounding braid surrounding the insulating jacket and the optional second layer. The metallic grounding braid serves to electrically ground the heating cable and also provides mechanical strength and abrasion resistance. When a metallic grounding braid is present, it generally is in the form of braided metal wires, although for applications in which flexibility is not critical, it is possible to use another type of metal layer, e.g. a sheath or metal tape. In this specification, the term "metallic grounding braid" is intended to include non-braided metal layers. In some applications, the grounding braid itself is surrounded by an insulating jacket to provide environmental and electrical insulation to the heating cable. Particularly suitable heating cables are self-regulating strip heaters in which the electrodes are elongate wires and the heating elements comprise a conductive polymer composition. Heaters of this type are described in U.S. Pat. No. 3,858,144 (Bedard et al), U.S. Pat. No. 3,861,029 (Smith-Johannsen et al), U.S. Pat. No. 4,017,715 (Whitney et al), U.S. Pat. No. 4,242,573 (Batliwalla), U.S. Pat. No. 4,334,148 (Kampe), U.S. Pat. No. 4,334,351 (Sopory), U.S. Pat. No. 4,426,339 (Kamath et al), U.S. Pat. No. 4,459,473 (Kamath), U.S. Pat. No. 4,574,188 (Midgley et al), and U.S. Pat. No. 5,111,032 (Batliwalla et al), the disclosures of which are incorporated herein by reference. The heating cable generally has an approximately rectangular cross-section with two generally parallel faces, although other geometries, e.g. round, oval, or elliptical, can also be effectively sealed by the sealing device of the invention.

The housing of the apparatus may be of any suitable shape, e.g. generally tubular or rectangular, as long as it comprises a first open end of a shape which is suitable for insertion of the cable, and a second closed end. In addition, the interior shape of the housing must be sufficient to accept an insert. The housing may be a single piece which has been molded around the insert into the appropriate shape, it may be assembled into a permanent configuration from a number of pieces, or it may comprise first and second housing members which are capable of existing in a demated or a mated configuration. In the demated configuration, the housing members may be separate pieces or they may be connected, e.g. by hinges, straps or a snap-fit. When mated, the two housing members are in contact with each other, either directly or through a sealing member, e.g. a gasket, and in such mated configuration, the two housing members form a housing which has an opening. It is particularly preferred that the housing be prepared of two identical pieces which are permanently fixed together, e.g. by ultrasonically welding or adhesive. The use of identical housing members allows a decrease in the number of components required for the apparatus. The housing may be physically or notionally separated into a longitudinal top portion and a longitudinal bottom portion, top and bottom being defined with respect to the axis of the housing, i.e. parallel to the axis of the opening. Both the top and bottom portions comprise an interior surface which is adjacent to and parallel to the opening and an exterior surface which is generally the exterior of the housing. Although the wall thickness of the housing is preferably constant, for some applications it is preferred that there be interior ribs or bosses or exterior grooves to provide strength. On one or both of the interior surfaces of the top and bottom portions, there may also be locking teeth or grooves that serve to engage and lock onto a locking mechanism present on the insert.

Gripping of the cable is done by means of an insert which is positioned within the housing. In order to accommodate a variety of cable sizes and shapes and to require relatively low insertion force, it is important that, prior to the insertion of a cable, the insert be free to move in an axial direction within the housing, as well as in a vertical direction within the housing, i.e. perpendicular to the axis of the housing. The insert is in the shape of a clip which has a first open end and a second closed end. The closed end is radiused, i.e. it has a semi-circular shape on its interior surface, i.e. the surface facing the opening of the housing. Extending from the closed end of the insert are a first top arm and a second bottom arm, each of which has an interior surface which faces the inserted cable and an exterior surface which faces the interior surfaces of the top and bottom portions of the housing. For ease of insertion of the cable, it is preferred that at least some part of the interior surface of the first and second arms nearest the open end be chamfered, i.e. be tapered toward the opening, and it is particularly preferred that the interior surface of the top and bottom portions of the housing have a complementary taper. Particularly useful is an insert of the type which when used in the housing acts as what is conventionally known as a "Chinese finger".

Contact with and gripping of the inserted cable is accomplished by a plurality of first gripping members which are associated with the interior surface of the first arm, and a plurality of second gripping members which are associated with the interior surface of the second arm. The gripping members are longitudinally spaced from the open end to the closed end of the housing, at regular or graduated intervals. The first and second gripping members are preferably positioned directly opposite one another, rather than offset, in order to make insertion of the cable easier and to avoid the necessity of forcing the cable into a serpentined configuration. The gripping members generally cover the entire circumference of the opening. They are preferably of uniform length as measured from the base of the gripping member at the interior surface of the arm to the end of the gripping member. In order to achieve sufficiently high pullout strength, it is particularly preferred that, in addition to the first and second gripping members, the insert also include at least one first pre-gripping member which is associated with the interior surface of the first arm and at least one second pre-gripping member which is associated with the interior surface of the second arm. The pre-gripping members are positioned near the closed end of the insert, between the closed end and the gripping members. Preferably the first and second pre-gripping members are positioned directly opposite one another.

Both the gripping members and the pre-gripping members are of generally rectangular cross-section, although other shapes may be used. The gripping and pre-gripping members are preferably positioned squarely on the appropriate interior surface of the insert arms, i.e. perpendicular to the interior surface at an angle of 90 degrees to the surface. Due to the flexibility of the insert, there is no need to position the gripping or pre-gripping members at an angle in order to get adequate gripping of the cable. Although the gripping surface of the gripping and pre-gripping members may be flat and perpendicular to the base, it is preferred that the surface of the gripping and pre-gripping members have a gripping end which is at an angle A, which, when measured parallel to the interior surface and to the axis of the housing, is 15 to 60 degrees. For the gripping members it is preferred that the gripping end have an angle A of 35 to 60 degrees, particularly 40 to 55 degrees, especially about 45 degrees. For the pre-gripping members it is preferred that the gripping end have an angle A of 15 to 40 degrees, particularly 20 to 35 degrees, especially about 30 degrees. The angle A is angled away from the open end so that when a pullout force is applied to the cable, the gripping members will grip the cable more firmly. For some applications, the gripping end may be serrated.

The dimensions of the gripping and pre-gripping members are dependent on the size and shape of the cable to be inserted. For cables having a thickness of 0.25 to 6.4 mm (0.010 to 0.250 inch), gripping and pre-gripping members often have a base with a thickness of 0.25 to 0.76 mm (0.010 to 0.030 inch), e.g. 0.38 mm (0.015 inch), and a gripping end thickness of 0.025 to 0.25 mm (0.001 to 0.010 inch), e.g. 0.076 mm (0.003 inch). For ease of installation, it is necessary that the gripping members, which are near the open end, be much shorter than the pre-gripping members which are near the closed end. Generally the pre-gripping members have a length which is at least 2 times, preferably at least 3 times, particularly at least 4 times, e.g. 5 to 7 times, the length of the gripping members. The gripping members generally have a length of 0.25 to 1.8 mm (0.010 to 0.070 inch), preferably 0.38 to 1.65 mm (0.015 to 0.065), particularly 0.51 to 1.5 mm (0.020 to 0.060 inch), especially 0.64 to 1.0 mm (0.025 to 0.040 inch), while the pre-gripping members generally have a length of 1.3 to 7.6 mm (0.050 to 0.300 inch), preferably 1.9 to 6.4 mm (0.075 to 0.250 inch), particularly 2.5 to 5.1 mm (0.100 to 0.200 inch).

To enhance the resistance to pullout, it is desirable to provide a locking mechanism on the exterior surface of at least one of the first arm and the second arm of the insert. The locking mechanism may be of any shape, but is preferably a tapered "wing" which protrudes from the exterior surface of the arm and is capable of engaging with locking teeth located on the interior surface of the housing. In order to provide the most resistance to pullout, it is preferred that a locking mechanism be present on both arms, and that locking teeth be present on the interior surface of both the longitudinal top portion and the longitudinal bottom portion of the housing.

On insertion of the cable into the housing so that the cut end of the cable contacts the closed end of the insert, the pre-gripping members, which are substantially longer than the gripping members, make initial contact with the cable and the closed end of the insert flexes and opens. When the cable is pulled back, the insert closes, causing the gripping members to penetrate the outermost layer of the cable, e.g. the insulating jacket of a heating cable or the metallic braid, if present. This closure of the insert also causes the locking mechanism to engage, preventing forward movement of the insert or the cable. If no gel component is present in the housing, there will be an audible indicator, i.e. a click, when insertion and locking are complete.

It is important that the cable be held in position with sufficient strength so that it cannot readily be pulled out of the sealing device. Generally a "pullout force" of at least 11.4 kg (25 pounds), preferably at least 13.6 kg (30 pounds), particularly at least 15.9 kg (35 pounds) is required for routine use. (The pullout force can be measured with an Instron™ tensile testing apparatus. The installed cable is gripped by one jaw of the Instron tester and the sealing device by the other jaw. The force required to pull the cable 3.2 mm (0.125 inch) out of the connector when the jaw holding the sealing device is stationary and the jaw holding the cable is moved is measured.) To achieve such pullout force, each of the gripping members generally penetrates the cable surface with which it is in contact, e.g. the insulating jacket, the braid, or the outer jacket, by at least 0.25 mm (0.010 inch), preferably at least 0.38 mm (0.015 inch), particularly at least 0.51 mm (0.020 inch), especially at least 0.64 mm (0.025 inch).

The housing and the insert may comprise an insulated metal or ceramic but preferably comprise a polymer which has an impact strength of at least 5 foot-pounds when shaped into the final sealing device configuration as measured by such tests as UL 746C, the disclosure of which is incorporated herein by reference. Preferred polymers are of light weight, can be shaped by injection- or transfer-molding or similar processing techniques, and will withstand required intermittent use and continuous use temperatures. Appropriate polymers include polycarbonate, nylon, polyester, polyphenylene sulfide, polyphenylene oxide, and other engineering plastics. Appropriate fillers and stabilizers may be present. For some applications it is preferred that the housing be made from a transparent polymer in order to aid in determining proper positioning of the inserted cable. The polymer used for the housing and the insert may be the same, but is it preferred that the insert be made of a softer material than the housing so that the insert will have flexibility and the housing will have impact strength. It is preferred that the housing have an impact strength of at least 10 foot-pounds. The gripping and pre-gripping members may comprise a different polymer from the housing and/or insert, although for ease of manufacture it is preferred that the polymer be the same as that of the insert.

For some applications, it is desirable that some or all of the sealing device be filled with a viscous sealing material in order to provide a good environmental seal at the end of the cable. Suitable materials include greases, adhesives, mastics, gels, and other materials, which, under compression, tend to conform to the surface of the cable to make a seal. Particularly preferred as sealing materials are gels, e.g. silicone gels, such as those disclosed in U.S. Pat. No. 4,600,261 (Debbaut), U.S. Pat. No. 4,690,831 (Uken et al), U.S. Pat. No. 4,716,183 (Gamarra et al), U.S. Pat. No.

4,777,063 (Dubrow et al), U.S. Pat. No. 4,864,725 (Debbaut et al), U.S. Pat. No. 4,865,905 (Uken et al), U.S. Pat. No. 5,079,300 (Dubrow et al), U.S. Pat. No. 5,104,930 (Rinde et al), and U.S. Pat. No. 5,149,736 (Gamarra); and in International Pat. Publication Nos. WO86/01634 (Toy et al), WO88/00603 (Francis et al), WO90/05166 (Sutherland), WO91/05014 (Sutherland), and WO93/23472 (Hammond et al). The disclosure of each of these patents and publications is incorporated herein by reference. The gel component is preferably placed in the housing prior to use. If two housing members are present, the gel component may be placed in one or both of the housing members. When the housing members are formed into the mated configuration, the gel component is displaced over the cable end and the insulating jacket, as well any grounding braid which is inside the housing. The presence of the gel component minimizes moisture ingress from outside the housing, from the cable, and from any grounding braid which may be present.

The sealing device of the invention can be used as part of an assembly which includes a cable and a gel component. In the assembly, the gel component has deformed and sealed around the cut end of the cable and the exterior surface of the cable. The sealing device is particularly useful in an assembly incorporating an electrical heating cable. It is generally preferred that the braid and any outer insulating jacket removed before insertion into the housing so that it is the insulating jacket which is gripped by the gripping members. However, if the gripping members are sufficiently long, they will act to grip the braid and provide adequate pullout force. If it is necessary to grip the braid, as well as the insulating jacket, it is preferred that the insert have a longer length from its closed end to its open end and/or that there be more gripping members than for an insert intended for gripping only the insulating jacket.

The invention is illustrated by the drawing in which FIG. 1 is a cross-sectional view of apparatus 1 which is a sealing device. The device comprises housing 3 which is made of longitudinal top portion 5 which has interior surface 7 and exterior surface 9 and longitudinal bottom portion 11 which has interior surface 13 and exterior surface 15. Top portion 5 and bottom portion 11 together form open end 17 and closed end 19. Present on the interior surfaces 7,13 are locking teeth 21. Insert 23, which has been designed with long arms and gripping members to grip both the metal braid and the insulating jacket of a heating cable, is positioned inside housing 3. Line I—I represents the axis of housing 3 through open end 17. Filling the interior of housing 3 and surrounding insert 23, but not shown, is a gel component.

Figure 2:
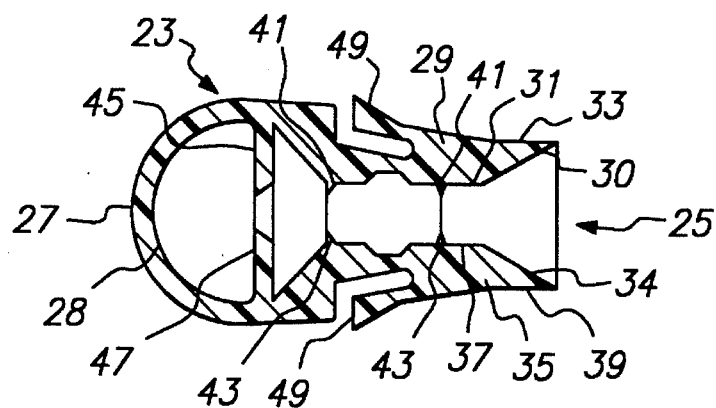
FIG. 2 is a cross-sectional view of an insert which comprises part of the apparatus.

FIG. 2 shows a cross-sectional view of insert 23 which is designed to grip the insulating jacket of a cable. Insert 23 is in the shape of a clip with open end 25 and closed end 27. The interior surface 28 of closed end 27 is radiused. First top arm 29 has interior surface 31 and exterior surface 33. Protruding from interior surface 31 are first gripping members 41 and first pre-gripping member 45. Second bottom arm 35 has interior surface 37 and exterior surface 39. Protruding from interior surface 37 are second gripping members 43 and second pre-gripping member 47. Edge 30 of top arm 29 and edge 34 of bottom arm 35 have a surface which is tapered toward the opening. Locking mechanism 49 is present on exterior surface 33 and exterior surface 39.

Figure 3:
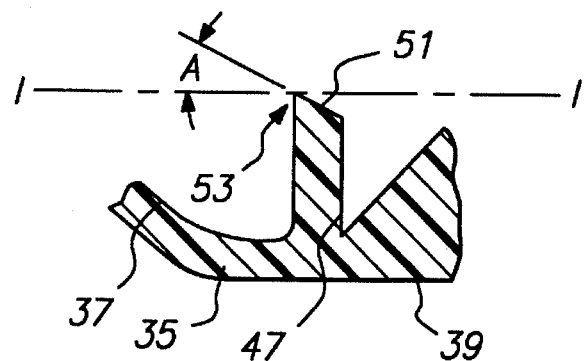
FIG. 3 is a cross-sectional view of a pre-gripping member which comprises part of the apparatus.

FIG. 3 is a cross-sectional view of second pre-gripping member 47 which protrudes from interior surface 37 of bottom arm 35. The gripping surface 51 of gripping end 53 is angled at an angle A which is measured parallel to interior surface 37, i.e. with respect to the axis of the insert and the housing.

Figure 4A:
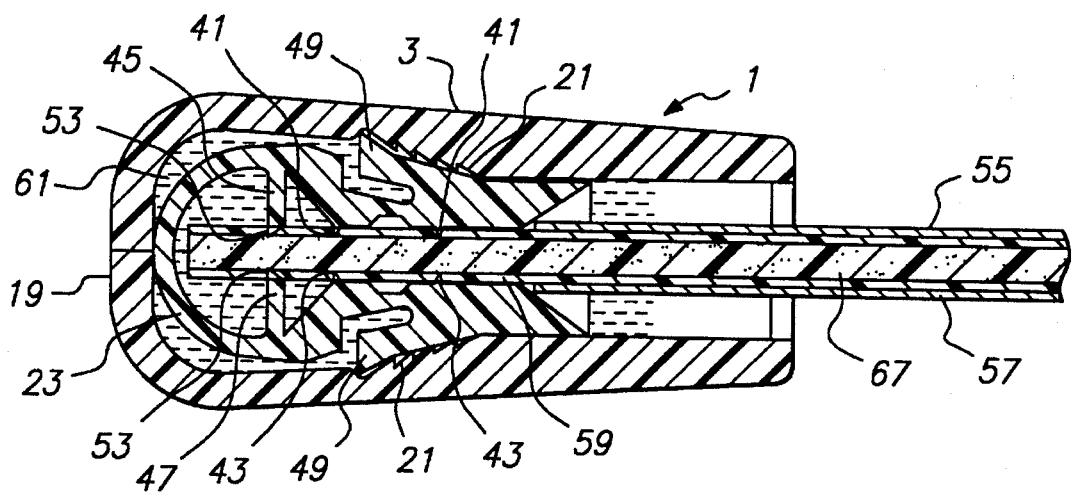
FIGS. 4a and 4b are schematic cross-sectional views of an assembly of the invention.
Figure 4B:
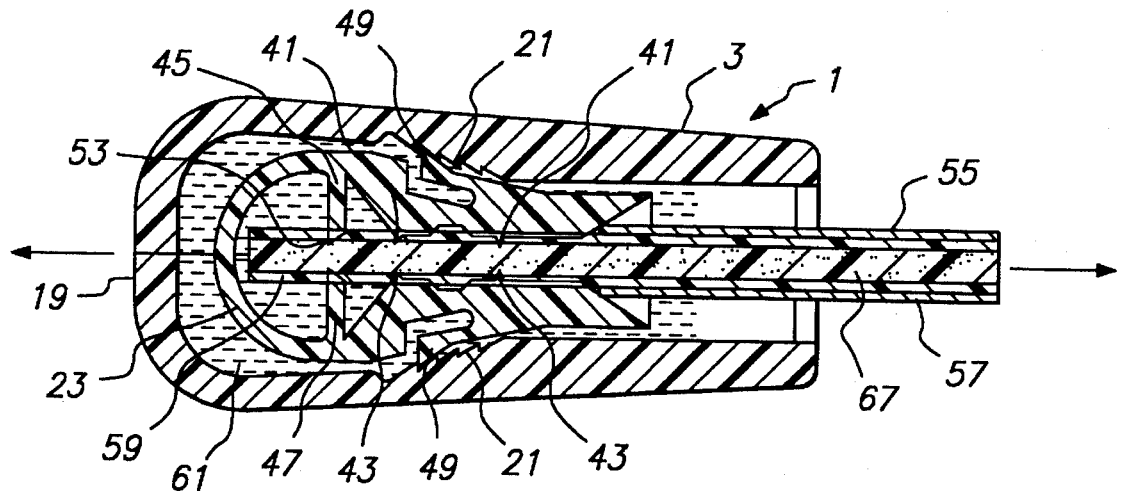

FIG. 4a shows in schematic cross-sectional view heating cable 55 after insertion into insert 23. Braid 57 has been removed from the section of heating cable 55 which contacts insert 23 to ensure that insulating jacket 59 which surrounds resistive heating element 67 is gripped by gripping members 41,43. As shown in FIG. 4b, after heating cable 55 has been locked into position by exerting a longitudinal force between apparatus 1 and heating cable 55, locking mechanism 49 has been engaged into locking teeth 21 and insert 23 has been closed. As a result, insert 23 has moved away from contact with the interior of closed end 19 which surrounds resistive heating element 67.

What is claimed is:

1. An apparatus for sealing the end of an elongate cable, said apparatus comprising
   (1) a housing of generally tubular shape, the housing comprising
      (a) a first open end and a second closed end,
      (b) a longitudinal top portion with an interior surface and an exterior surface, and
      (c) a longitudinal bottom portion with an interior surface and an exterior surface; and
   (2) a polymeric insert which is positioned within the housing and is free to move in an axial direction within the housing and in a vertical direction within the housing, which insert
      (a) is in the shape of a clip having a first open end and a second closed end and two open sides,
      (b) comprises a first top arm with an interior surface and an exterior surface, and a second bottom arm with an interior surface and an exterior surface, said first and second arms extending from the closed end of the insert,
      (c) a plurality of first gripping members which are associated with the interior surface of the first arm, and
      (d) a plurality of second gripping members which are associated with the interior surface of the second arm.

2. An apparatus according to claim 1 wherein the insert further comprises
   (e) at least one first pre-gripping member which is associated with the interior surface of the first arm, and
   (f) at least one second pre-gripping member which is associated with the interior surface of the second arm.

3. An apparatus according to claim 1 wherein the closed end of the insert has a radiused shape.

4. An apparatus according to claim 1 wherein the housing comprises two housing members which can be in (a) a demated configuration or (b) a mated configuration in which the housing members are in contact with each other and form a housing.

5. An apparatus according to claim 4 wherein the two housing members are identical.

6. An apparatus according to claim 1 wherein the interior surface of the longitudinal top portion and the interior surface of the longitudinal bottom portion comprise locking teeth.

7. An apparatus according to claim 6 wherein at least one of the exterior surface of the first arm and the exterior surface of the second arm comprises a locking mechanism suitable for connection to the locking teeth.

8. An apparatus according to claim 1 wherein the housing comprises a transparent polymer.

9. An apparatus according to claim 1 wherein the first gripping members are located directly opposite the second gripping members.

10. An apparatus according to claim 2 wherein the first gripping member and the second gripping member which are nearest to the open end of the insert are shorter than the first pre-gripping member and the second pre-gripping member which are nearest to the closed end of the insert.

11. An apparatus according to claim 2 wherein
  (1) each of the first gripping members and the first pre-gripping members comprises a base which is associated with the interior surface of the first arm,
  (2) each of the second gripping members and the second pre-gripping members comprises a base which is associated with the interior surface of the second arm,
  (3) each of the first gripping members, the second gripping members, the first pre-gripping members, and the second pre-gripping members comprises a gripping end which (a) is at an angle A to the axis of the housing and (b) is suitable for penetrating an insulating jacket or a braid on a substrate.

12. An apparatus according to claim 11 wherein the gripping end of each of the first gripping members, the second gripping members, the first pre-gripping members, and the second pre-gripping members has an angle A of 15 to 60 degrees.

13. An apparatus according to claim 12 wherein the gripping end of the first gripping members and the second gripping members has an angle A of 35 to 60 degrees.

14. An apparatus according to claim 12 wherein the gripping end of the first pre-gripping members and the second pre-gripping members has an angle A of 15 to 40 degrees.

15. An apparatus according to claim 1 wherein the first and second gripping members penetrate to a depth of at least 0.13 mm (0.005 inch).

16. An apparatus according to claim 1 which comprises a gel component.

17. An assembly comprising
  (A) an apparatus comprising
    (1) a housing of generally tubular shape, the housing comprising
      (a) a first open end and a second closed end,
      (b) a longitudinal top portion with an interior surface and an exterior surface, and
      (c) a longitudinal bottom portion with an interior surface and an exterior surface;
    (2) a polymeric insert which is positioned within the housing and is free to move in an axial direction within the housing and in a vertical direction within the housing, which insert
      (a) is in the shape of a clip having a first open end and a second closed end and two open sides,
      (b) comprises a first top arm with an interior surface and an exterior surface, and a second bottom arm with an interior surface and an exterior surface, said first and second arms extending from the closed end of the insert,
      (c) a plurality of first gripping members which are associated with the interior surface of the first arm,
      (d) a plurality of second gripping members which are associated with the interior surface of the second arm,
      (e) at least one first pre-gripping member which is associated with the interior surface of the first arm, and
      (f) at least one second pre-gripping member which is associated with the interior surface of the second arm; and
    (3) a gel component; and
  (B) an end of an elongate cable which is inserted through the open end of the insert and which directly contacts the gripping end of at least one first gripping member, one second gripping member, one first pre-gripping member, and one second pre-gripping member.

18. An assembly according to claim 17 wherein the elongate cable comprises an electrical heating cable comprising
  (a) first and second elongate electrodes,
  (b) a plurality of resistive heating elements connected in parallel between said electrodes, and
  (c) an insulating jacket surrounding said electrodes and heating elements,
wherein the gripping end of at least one first gripping member, one second gripping member, one first pre-gripping member, and one second pre-gripping member directly contacts the insulating jacket.

19. An assembly according to claim 18 wherein the gel component within the housing is deformed and seals around the insulating jacket and the heating cable end.

20. An assembly according to claim 18 wherein a pullout force of at least 11.4 kg (25 pounds) is required to pull the heating cable out of the housing.

* * * * *

UNITED STATES PATENT AND TRADEMARK OFFICE
CERTIFICATE OF CORRECTION

PATENT NO. : 5,622,642

DATED : April 22, 1997

INVENTOR(S) : Edwards et al.

Figure 5:
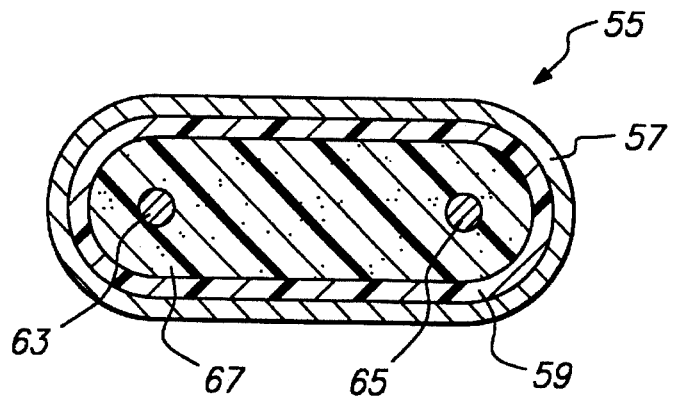
FIG. 5 is a cross-sectional view of a heating cable suitable for use with the apparatus of the invention or in the assembly of the invention.

It is certified that error appears in the above-indentified patent and that said Letters Patent is hereby corrected as shown below:

Column 8, lines 10 to 11, replace "which surrounds resistive heating element 67" by --. Gel 61 fills closed end 19 of housing 3.
Figure 5 shows in cross-section heating cable 55 which is suitable for use with apparatus 1. Elongate first and second electrodes 63,65 are embedded in resistive heating element 67 which is formed from a conductive polymer composition. Insulating jacket 59 surrounds resistive heating element 67; metallic braid 57 surrounds insulating jacket 59.--

Signed and Sealed this

Eighth Day of July, 1997

Attest:

BRUCE LEHMAN

Attesting Officer

Commissioner of Patents and Trademarks